United States Patent
Sedy

Patent Number: 5,388,843
Date of Patent: Feb. 14, 1995

[54] FLUID FILM SEAL

[75] Inventor: Josef Sedy, Mount Prospect, Ill.

[73] Assignee: Durametallic Corporation, Kalamazoo, Mich.

[21] Appl. No.: 225,349

[22] Filed: Apr. 8, 1994

Related U.S. Application Data

[63] Continuation of Ser. No. 18,264, Feb. 16, 1993, abandoned.

[51] Int. Cl.⁶ .................................................. F16J 15/16
[52] U.S. Cl. .................................. 277/81 R; 277/96.1; 277/136; 277/149
[58] Field of Search .............. 277/83, 84, 96, 96.1, 277/81 R, 136, 138, 149, 157, 160

[56] References Cited

U.S. PATENT DOCUMENTS

| | | | |
|---|---|---|---|
| 700,988 | 5/1902 | Stayman | 277/149 |
| 1,339,297 | 5/1920 | Spicer | 277/136 |
| 2,220,344 | 11/1940 | McFall | 277/149 |
| 2,407,218 | 9/1946 | Beier | 286/11 |
| 2,610,874 | 9/1952 | Payne | 277/81 R |
| 3,333,855 | 8/1967 | Andresen | 277/40 |
| 3,377,075 | 4/1968 | Feller | 277/160 |
| 4,082,296 | 4/1978 | Stein | 277/3 |
| 4,407,513 | 10/1983 | Takenaka et al. | 277/96.1 |
| 4,416,458 | 11/1983 | Takenaka et al. | 277/96.1 |
| 4,659,092 | 4/1987 | Wallace et al. | 277/96 X |
| 4,836,561 | 6/1989 | Lebeck et al. | 277/96.1 X |
| 5,039,113 | 8/1991 | Gardner | 277/96.1 X |
| 5,066,026 | 11/1991 | Heck et al. | 277/96.1 |

FOREIGN PATENT DOCUMENTS

| | | | |
|---|---|---|---|
| 0499370 | 8/1992 | European Pat. Off. | 277/96.1 |
| 0080559 | 7/1981 | Japan | 277/84 |
| 4181073 | 6/1992 | Japan | 277/96.1 |

*Primary Examiner*—William A. Cuchlinski, Jr.
*Assistant Examiner*—John L. Beres
*Attorney, Agent, or Firm*—Flynn, Thiel, Boutell & Tanis

[57] ABSTRACT

Fluid film seal for shafts rotating at high speeds with improved centering means for low unbalance of the rotating seal ring. Centering and drive means are combined and interspaced at the center portion of the outer diameter of the symmetrical rotatable seal ring. The drive and centering at the outer ring diameter direct drive and centering forces inward, lowering tensile stresses due to centrifugal forces. Symmetry of the rotatable seal ring cross-section makes also centrifugal stresses symmetrical with no resulting torsion around the ring cross section to cause face distortions and yields an alternate seal surface at the back side of subject seal ring.

8 Claims, 1 Drawing Sheet

FLUID FILM SEAL

This application is a continuation of U.S. Ser. No. 08/018,264, filed Feb. 16, 1993, now abandoned.

This invention relates to sealing devices for rotating shafts where a fluid is employed to generate pressure forces between interacting face-type sealing elements, in which one is stationary and the other rotating. These forces provide for slight separation and non-contacting operation of the above sealing elements, thereby minimizing face wear and friction losses while maintaining low fluid leakage.

BACKGROUND OF THE INVENTION

Non-contacting face seals are usually applied to high-speed high-pressure rotating equipment, where the use of ordinary mechanical face seals with face contact would result in excessive generation of heat and wear. Non-contacting operation avoids this undesirable face contact when the shaft is rotating above a certain minimum speed, which is called a lift-off speed.

As with ordinary mechanical seals a fluid film face seal consists of two sealing rings, each of which is provided with a very precisely finished sealing surface. These surfaces are perpendicular to and concentric with the axis of rotation. Both rings are positioned adjacent to each other with the sealing surfaces in contact at conditions of zero pressure differential and zero speed of rotation. One of the rings is normally fixed to the rotatable shaft, the other located within the seal housing structure and allowed to move axially but not allowed to turn. The seal housing structure is normally stationary and fixed to the body of the compressor, turbine or pump to which the seal is applied.

To achieve non-contacting operation of the seal, one of the two sealing surfaces in contact is normally provided with shallow surface recesses, which act to generate pressure fields that force two sealing surfaces apart. These recesses may have a shape of spiral grooves 0.0002 inches deep, spaced uniformly around the sealing surface, extending from the outer circumference inward and ending at a particular diameter normally larger than the inner diameter of that sealing surface. When the magnitude of the forces resulting from these pressure fields is large enough to overcome the forces that hold seal faces closed, the sealing surfaces will separate and form a clearance, resulting in non-contacting operation. The character of the separation forces is such that the force magnitude decreases with the increase of face separation. Opposing or closing forces, on the other hand, depend on sealed pressure level and as such are independent of face separation. They result from the sealed pressure and the spring force acting on the back surface of the axially movable sealing ring. Since the opening force depends on the separation distance between sealing surfaces, unlike the closing force, during the operation of the seal or on imposition of sufficient pressure differential, equilibrium separation between both surfaces will establish itself. This occurs when closing and opening forces are equal to each other.

Equilibrium separation constantly changes within the range of gaps. The goal is to have the low limit of this range above zero to prevent face contact. Another goal is to make this range as narrow as possible, because on its high end the larger separation between the faces will lead to increased seal leakage.

Since non-contacting seals operate by definition with a clearance between sealing surfaces, their leakage will be higher then that of a contacting seal of similar geometry. Yet, the absence of contact will mean insignificant wear on the sealing surfaces and therefore a relatively low amount of heat generated between them. It is this low generated heat and lack of wear that enables the application of non-contacting seals to high-speed turbomachinery, where sealed fluid is gas. Turbocompressors are used to compress this fluid and since gas has relatively low mass, they normally operate at very high speeds and with a number of compression stages in series. This requires relatively long shafts that have to operate frequently above their critical speeds. Neither seals nor bearings can be permitted to contact the shaft at these high speeds, so the shafts are therefore made to float on fluid films, both at the bearings and the seals.

In the above situation, it becomes important to make sure that the shaft does not vibrate excessively during operating speeds as well as during acceleration or deceleration. This means that the shaft inertia axis must be as close to its geometrical axis as possible, since the bearings will be forcing shaft rotation around its axis of geometry rather than around its axis of inertia.

Should there be a significant discrepancy between the inertia and geometry axes, the shaft would be prone to vibrations, making it likely to contact stationary parts in its vicinity. Such contact may result in overheating, wear and perhaps a failure at the bearing or the seal. To prevent the above problem, shafts are normally balanced by a selective removal of shaft material or by redistribution of weights at its periphery. This balancing thus eliminates the effects of machining inaccuracy and/or material non-uniformity.

Since the shaft rotates with components attached to it, such as compressor impellers, bearing sleeves and seal rings, it is necessary to balance it with these components in place. While many can be fixed to the shaft during its manufacture and therefore balanced in the manufacturer's shop, rotating parts of the fluid film seal normally come as a part of the seal cartridge and are mounted onto the shaft on site in the process plant and thus away from the manufacturer's shop. Special care, therefore, has to be exercised to keep the unbalance of the rotating seal parts to a minimum. A key requirement in this regard is that rotating parts remain concentric to the shaft at all times. This is not easy to accomplish, because seal components are often of diverse materials with widely different coefficients of thermal expansion and moduli of elasticity. As the machine goes through thermal, speed and pressure cycles, clearances between concentric components may change.

One way of maintaining the concentricity of components despite variation in clearance is to place flexible elements between both concentric components. As the clearance changes, the flexible element deforms elastically an equal amount all around and thus maintains concentricity. This is a good solution with ductile materials such as steels with predictable yield points in tension and compression. With brittle materials of choice for fluid film seals though the tensile stresses due to centrifugal effects may come quite close to transverse rupture strength of these materials. In addition, there is a degree of unpredictability to the actual strength of the particular part because of locked-in manufacturing stresses that often cannot be annealed out. To center such a part mounted on a high speed shaft means to subject it to additional stresses on top of those already there. One example of such a solution is prior art to U.S. Pat. No. 5,039,113. This patent shows how a rotating sealing ring can be supported by an elastic strip at its inner diameter. Subject prior art shows a seal ring non-symmetrical in cross-section and an elastic strip supporting the ring close to one of its axial ends. Prior art to U.S. Pat. No. 5,066,026, on the other hand, does provide a symmetrical rotatable seal ring driven concentrically at its outer diameter, but there is no elastic element to assure concentricity. With different coefficients of thermal expansion it is necessary to build in clearances between annular components, otherwise clearance may disappear on change in temperatures and parts may lock together. Such a situation is often not desirable since it may lead to ring fracture or, at the very least, to unpredictable distortions. On the other hand, with clearances present, some unbalance may be expected without centering means. As far as symmetry is concerned, the main advantage of having a radially symmetrical rotatable ring cross-section appears at high speeds of rotation, where the stress distributions due to centrifugal forces in such a ring would also be symmetrical, cancelling out any torsional moments around the cross-section that might distort the sealing face.

SUMMARY AND OBJECT OF THE INVENTION

This invention is aimed at maintenance of concentricity and drive between an annular seal ring and its retaining element, where both are assembled with a clearance fit. This is done with an objective of minimizing tensile stresses in the seal ring of a symmetrical cross-section rotating at high speeds, stresses which are due to centrifugal forces. The invention combines drive and centering means. Also, the back face of the seal ring is provided with an alternate sealing face, an additional benefit of having a symmetrical rotatable seal ring.

The improvement places both the centering means and drive means at the outer diameter of the sealing ring and at the radial axis of symmetry of ring cross-section. This directs the centering as well as drive forces inward and towards the center of the ring, resulting in compressive stresses. These stresses subtract from the significant centrifugal tensile stresses due to rotation, which results in reduced stress levels and a lesser possibility of tensile stress fracture. Drive means shown comprise an ear and dent system where the dents are located equidistantly around the periphery of the sealing ring and these are engaged by protrusions or ears of the retaining structure. The alternate placement of ears onto the sealing ring and dents into the retaining structure is also effective. The engagement of dents and ears prevents mutual turning of both components, thereby providing the drive. The seal ring can be either substantially homogeneous and of one material as shown or a composite consisting of two or more materials, as long as the structure in terms of distribution of different materials is symmetrical to the radial axis of the seal ring cross-section. Interfaces between materials may be, for example, those achieved by thermal or electrolytic deposition or by shrink fit.

The centering means utilizes the circumferential space between points of drive engagement. Thereby the centering means can occupy the same prime area at the center of the seal ring outer diameter as the drive means to preserve symmetrical loading. The means shown comprise a wavy strip made of high yield strength spring material, which is partially flattened and thus preloaded during installation. Thereafter it acts as a stiff radial spring, which flexes as the temperature dilations increase or decrease the clearance between the two components centered. This occurs uniformly all around since the structure is axisymmetrical, thus the centered relationship between the two parts is preserved. Other spring shapes made from flat spring stock or coiled spring wire with slanted coils are also effective.

The alternate sealing face on the back side of the rotatable seal ring with the reverse hydrodynamic pattern on it makes it possible to turn the seal ring around, if there is a need to apply the seal to the opposite direction of rotation. The seal can therefore be made to run in either direction by choosing as the sealing face the side with the proper hydrodynamic pattern on it. The seal ring can have also two identical patterns on both its sides.

DESCRIPTION OF THE PREFERRED EMBODIMENTS

Figure 1:
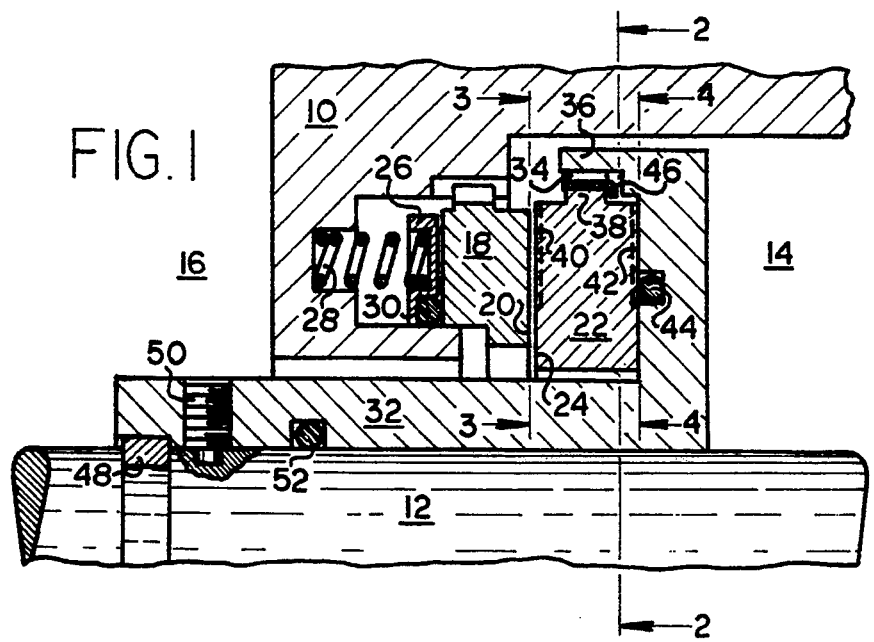
FIG. 1 is a cross-sectional view of a non-contacting seal, constructed in accordance with this invention, taken along the longitudinal axis thereof.

Referring first to FIG. 1, there is shown the invention and its environment. This environment comprises a housing 10 and a rotatable shaft 12, extending through said housing. The invention is applied to seal a fluid within the annular space 14 and to restrict its escape into the fluid environment at 16. The basic components of the invention comprise an annular, axially movable sealing ring 18, having a radially extending face 20 in a sealing relationship with a radially extending face 24 of an annular rotatable sealing ring 22. The sealing ring 18 is located within housing 10 and held substantially concentric to rotatable sealing ring 22. Between housing 10 and the sealing ring 18 is a plurality of springs 28, held equidistantly within housing 10 on one end and within spring disc 26 on the other end. Springs 28 urge the sealing ring 18 into engagement with the sealing ring 22 through an O-ring 30, which seals the space between the sealing ring 18 and the housing 10. The sealing ring 22 is held concentric to shaft sleeve 32 by a wavy centering strip 34 which is elastically deformed between recessed flange 36 of shaft sleeve 32 and outer extension 38 of sealing ring 22. Centering strip 34 has tabs 46 at one of its sides. Tabs 46 are bent behind extensions 38 to prevent centering strip 34 from working its way out of engagement during the rotation of shaft 12. Sealing ring 22 is symmetrical in cross-section along its radial axis, having hydrodynamic pattern 40 on its sealing face 24 and hydrodynamic pattern 42 on its opposite face. The depth of both patterns 40 and 42 is shown exaggerated and O-ring 44 has actually no trouble sealing on top of pattern 42. O-ring seal 44 precludes leakage between the sealing ring 22 and the shaft sleeve 32. Shaft sleeve 32 is located axially against a split ring 48 and locked for rotation with shaft 12 by a set screw 50. Leakage between shaft 12 and shaft sleeve 32 is precluded by an O-ring 52. In operation, the radially extending face 24 of the sealing ring 22 is in sealing relationship with sealing ring 18, maintaining very narrow clearance, generated by a shallow and concentric hydrodynamic groove pattern 40, where the subject grooves extend from the outer periphery of the face 24 inward, having in many cases a shape of the logarithmic spiral and ending at a diameter larger than that of the inner extent of sealing face 20. Pattern 40 can be electroplated, etched or otherwise fabricated into face 24 of the sealing ring 22 or alternatively into face 20 of the sealing ring 18. Said narrow clearance prevents generation of friction heat and wear, yet limits outflow of the sealed fluid, present at space 14.

Figure 2:
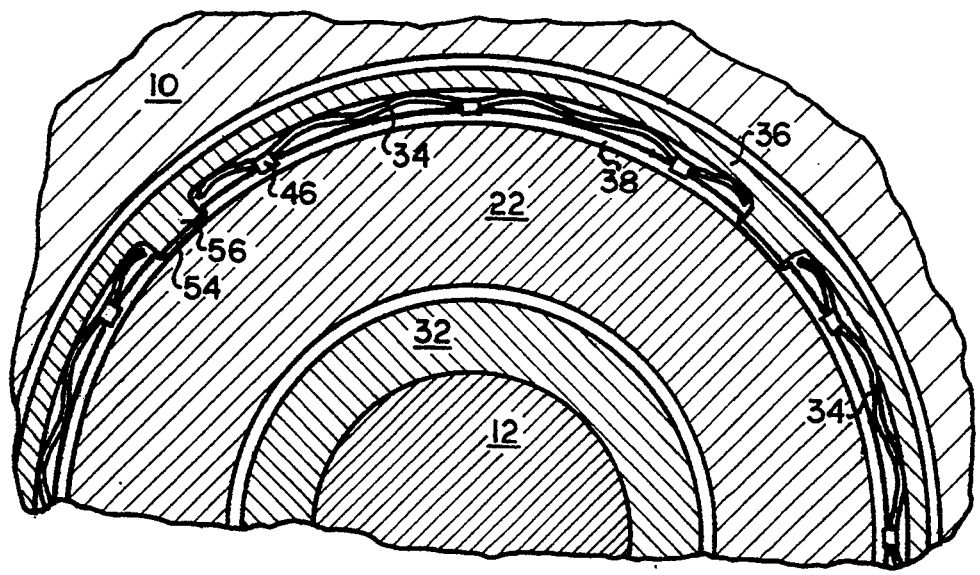
FIG. 2 is a section, partially broken away, taken along the line 2—2 of FIG. 1 and viewed in the direction of the arrows.

FIG. 2 shows the detail of wavy centering strips 34, the ends of each being in close proximity to drive dents 54 of the sealing ring 22. Each drive dent 54 engages a drive ear 56 of recessed flange 36. It can be readily seen how outer extension 38 is alternately utilized for driving and centering of the seal ring 22. Both centering and drive transmit forces from the shaft sleeve 32 to the seal ring 22 and subject design makes sure that these forces act near the axis of symmetry of the seal ring 22 cross-section for minimal ring distortions.

Figure 3:
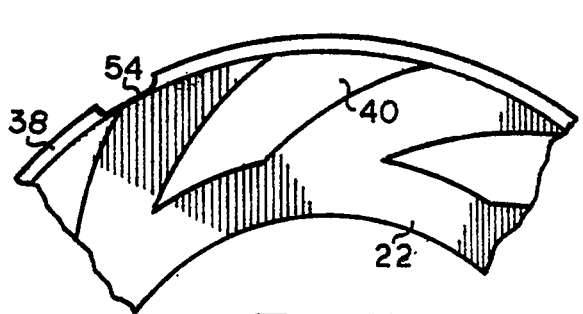
FIG. 3 is a fragmentary view of a rotatable sealing ring taken in the direction of the arrows along the line 3—3 of FIG. 1.

FIG. 3 shows the partial end view of the face 24 of sealing ring 22. Spiral groove pattern 40 is of such orientation that the rotation of the seal ring 22 in clockwise direction would generate slight separation between sealing rings 22 and 18 for proper non-contacting operation.

Figure 4:
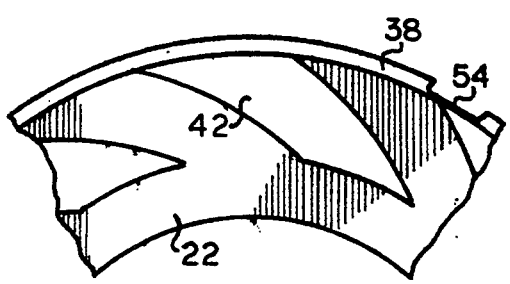
FIG. 4 is a view similar to FIG. 3 and taken in the direction of the arrows along the line 4—4 of FIG. 1.

FIG. 4 shows the partial end view of the opposite side of sealing ring 22. Spiral groove pattern 42 is of such orientation that should ring 22 be turned around for this side to face ring 18, the rotation of the seal ring 22 in counter-clockwise direction would generate slight separation between sealing rings 22 and 18 for proper non-contacting operation.

I claim:

1. Device for sealing a fluid at a space between a housing and a rotatable shaft, comprising:
   a first seal ring, mounted on said shaft for rotation therewith and comprising a planar back surface, a planar front sealing surface and a raised portion,
   said raised portion being circumferentially oriented and located axially midway across an outer surface of said first seal ring,
   a second seal ring, being axially movable and substantially coaxial with said first seal ring,
   said second seal ring having a planar sealing surface defining a clearance with said first seal ring planar front sealing surface,
   said second seal ring being acted upon by said fluid to close said clearance,
   an elastic means, connected between said housing and said second seal ring for biasing said second seal ring towards said first seal ring to close said clearance,
   one of said planar sealing surfaces having a plurality of grooves formed therein, said grooves arranged in spaced relation to each other,
   a shaft sleeve connected to said shaft and having an inner cylindrical surface adjacent said shaft and an another inner cylindrical surface adjacent said first seal ring,
   said another cylindrical surface comprising at least two inwardly extending drive ears,
   each said drive ears engaging a drive dent in said raised portion of said first seal ring,
   at least two centering strips located radially between said another cylindrical surface of said shaft sleeve and said raised portion of said first seal ring and located circumferentially between each two adjacent said drive ears.

2. Device according to claim 1, where said centering strips are made from flat spring stock and are manufactured wavy in the circumferential direction.

3. Device according to claim 2, where said grooves are substantially spiral in shape.

4. Device according to claim 2, where both said planar surfaces of said first seal ring have said grooves formed therein.

5. Device according to claim 4, where said grooves on one said planar surface are of the opposite direction to said grooves on the other said planar surface of said first seal ring.

6. Device according to claim 5, where said grooves are substantially spiral in shape.

7. Device according to claim 4, where said grooves on one said planar surface are of the same direction as said grooves on the other said planar surface of said first seal ring.

8. Device according to claim 7, where said grooves are substantially spiral in shape.

* * * * *